United States Patent [19]

Benson

[11] 4,081,339
[45] Mar. 28, 1978

[54] METHOD OF DEUTERIUM ISOTOPE SEPARATION AND ENRICHMENT

[76] Inventor: Sidney W. Benson, 533 Palos Verdes Dr. West, Palos Verdes Estates, Calif. 90274

[21] Appl. No.: 706,252

[22] Filed: Jul. 19, 1976

[51] Int. Cl.² .............................. B01J 1/10; C01B 4/00
[52] U.S. Cl. ............................ 204/158 R; 204/162 R; 204/DIG. 11; 423/648 A; 423/580
[58] Field of Search .................. 204/158 R, DIG. 11, 204/162 R; 423/648, 580

[56] References Cited

U.S. PATENT DOCUMENTS

| 3,904,500 | 9/1975 | Jensen | 204/DIG. 11 |
| 3,947,335 | 3/1976 | Marling | 204/158 R |

*Primary Examiner*—Howard S. Williams
*Attorney, Agent, or Firm*—Blakely, Sokoloff, Taylor & Zafman

[57] ABSTRACT

A method of separating deuterium, i.e. heavy hydrogen, from certain naturally occuring sources using tuned infrared lasers to selectively decompose specified classes of organic molecules (i.e. RX) into enriched molecular products containing deuterium atoms. The deuterium containing molecules are easily separated from the starting material by absorption, distillation or other simple chemical separation techniques and methods. After evaporation such deuterium containing molecules can be burned to form water with an enriched deuterium content or pyrolyzed to form hydrogen gas with an enriched deuterium content. The undecomposed molecules and the other reaction products which are depleted of their deuterium containing species can be catalytically treated, preferably using normal water, to restore the natural abundance of deuterium and such restored molecules can then be recycled.

31 Claims, 1 Drawing Figure

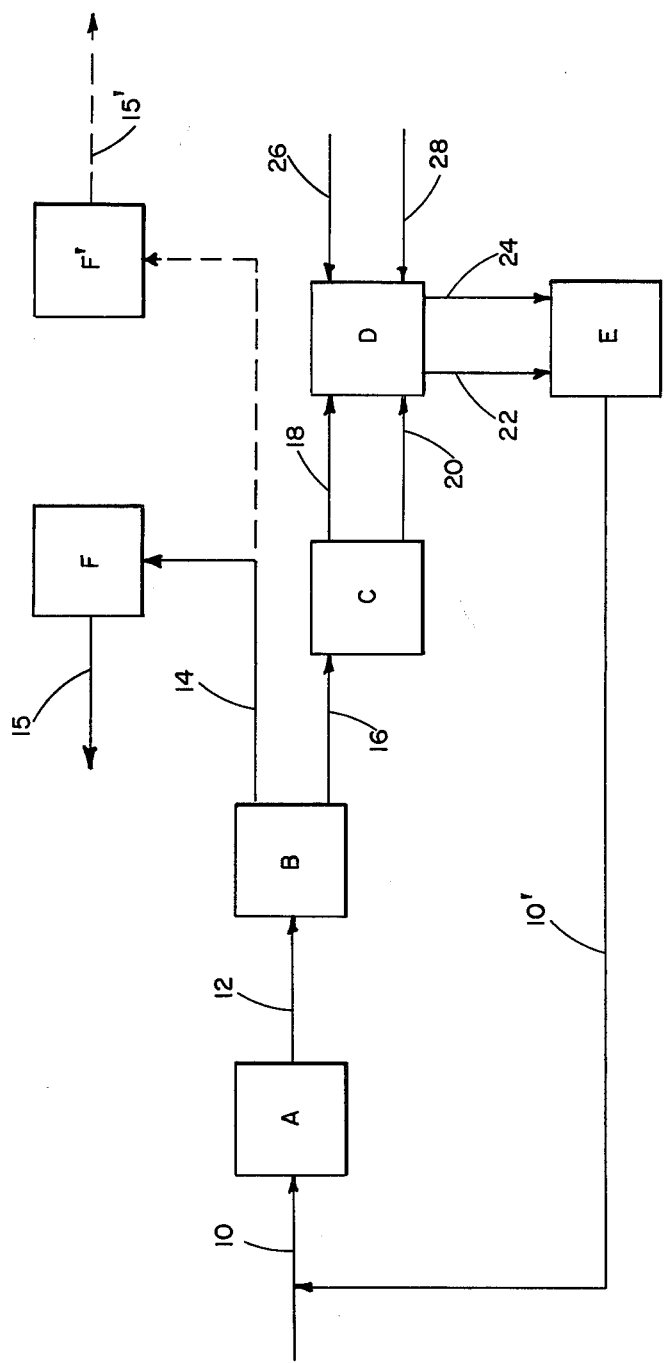

METHOD OF DEUTERIUM ISOTOPE SEPARATION AND ENRICHMENT

BACKGROUND OF THE INVENTION

1. Field of the Invention

The present invention generally relates to deuterium isotope separation and enrichment and more particularly to deuterium isotope separation and enrichment using infrared laser technology in combination with chemical processes for treating and recycling the unreacted and deuterium depleted starting materials.

2. Description of the Prior Art

Deuterium occurs in nature to the extent of about 0.014%. Presently, multi-stage equilibrium partition methods are employed to concentrate the naturally occurring deuterium. Such methods involve bulky equipment and large materials handling problems because of low enrichment factors per stage. Therefore, there is low throughput and long time periods involved in order to attain steady state equilibrium conditions.

Prior art systems using counter-current extraction and exchanges are well-known and the principles thereof are described in Kirk-Othmer, "Encyclopedia of Chemical Technology" - 2nd edition. John Wiley & Sons, New York, Vol. 8 - Chapter on "Extraction", E. G. Scheibel (1965) and Vol. 13 - Chapter on "Mass Transfer", A. H. P. Skelland (1967).

Also, the following references describe some of the presently known isotope separation techniques. William Spindel, "Isotope Separation Processes", A.C.S. Symposium Series, 11, "Isotope and Chemical Principles", Page 77, Am. Chem. Soc. (1957), Washington, D.C. (including references contained therein e.g., F. T. Barr and W. P. Drews, Chem. Eng. Progress, 56, 49 (1960); and P. B. Lumb, Nucl. Eng. Int., Page 64 (June, 1976)).

Laser technology has been recently used for producing isotopically selective chemical reactions and isotope separation. Developments in laser technology have demonstrated the use of tuned, infrared lasers to "pump up" the internal energy of a specified molecule to the point where it can decompose. For example, various laser techiques involving separation of isotopes are described in "Experimental and Theoretical Studies of Laser Isotope Separation" by J. P. Aldridge, et al, prepared by The Los Alamos Scientific Laboratory (LA-UR-75-2368) and "Isotopically Selective Photochemistry" by R. V. Ambartzumian and V. S. Letokhov published in the July, 1975 edition of Laser Focus. However, none of the techniques known to the inventor involve the presently invented method for deuterium isotope enrichment using intense tuned infrared laser technology to selectively dissociate a specific class of organic molecules having a high normal abundance of deuterium, to separate the deuterium enriched molecular species from the depleted molecular species (without any need for radical scavengers) and to treat the depleted molecular material with an inexpensive material, such as water, to replenish the deuterium content for recycling purposes.

SUMMARY OF THE INVENTION

The purpose of the present invention is to provide an inexpensive efficient method for the separation of deuterium from naturally occurring sources of hydrogen, such as water. The availability of deuterium in large amounts is of great practical importance to the technology of nuclear fission reactors. Deuterium (in heavy water) is used as a moderator in nuclear fission reactors. The present invention makes the production of power from a heavy water moderated reactor much more economical. A heavy water reactor has a major advantage of being able to operate on natural uranium and does not require enriched uranium. Since the cost of pure heavy water is an appreciable portion of the capital costs and a lesser but significant part of the over-all operating expenses of a heavy water reactor, the availability of inexpensive heavy water is of great importance in the nuclear fission reactor field.

As described above, laser technology has developed whereby intense tuned, infrared lasers can now be used to cause a specified molecule to selectively decompose. The present invention makes use of this technique to dissociate special classes of organic molecule which will preferentially decompose into stable molecular products rather than reactive radicals. If reactive radicals are produced, then one must simultaneously introduce radical scavengers to prevent the "scrambling" of identity between the isotopically selected, irradiated molecules and the non-isotope bearing molecules in a vessel or container. Stable molecular fragments which do not readily react avoid such "scrambling" problems. The present invention eliminates the reduced yields which are typically inherent when reactive radicals are produced and also eliminates the need to handle large amounts of radical scavengers.

The clases of molecules which lend themselves readily to the selective laser radiation of the present invention are organic molecules having the general formula RX in which R is selected from the ethyl, isopropyl, t-butyl, or cyclopentenyl groups and X is a functional group such as F, Cl, Br or OH and in the special case of cyclopentene it can even be H.

Briefly, in the present invention the selected normal RX molecules (i.e. those molecules containing a normal abundance of hydrogen and deuterium) are exposed to suitably focussed intense infrared laser beam radiation. The infrared spectra of the RX molecules having deuterium will differ appreciably from its non-deuterated species. By proper tuning, focussing and pulsing of an infrared laser, substantially all of the deuterium containing RX molecules exposed to the laser can be selectively dissociated and then separated from the starting material and other reaction products.

Under proper conditions after exposure to the laser radiation an olefin containing the deuterium atom and HX is formed. The olefin with deuterium (olefin (D)) is stripped from the undecomposed, deuterium depleted stream of RX and HX. The enriched olefin (D) can be burned to form water with an enriched deuterium content or pyrolyzed to form hydrogen gas with an enriched deuterium content.

The undecomposed or unreacted RX molecules depleted of their deuterium containing species can then be decomposed into deuterium olefins and HX by heating over a catalyst. The latter products can then be separated and catalytically exchanged with normal water (or $H_2$) to restore the normal isotopic composition and then catalytically recombined, if necessary, to form normal RX which can be recycled.

The details of the invented method, as well as the theory of operation, will be better understood in light of the discussions and explanations of the annexed drawing and the preferred methods and techniques described hereinafter.

BRIEF DESCRIPTION OF THE DRAWINGS

The drawing is a block type flow diagram showing in schematic form a preferred form of the invented process for obtaining deuterium isotope enrichment and the recycle arrangement for restoring deuterium in a continous manner using normal water as the source of deuterium.

DESCRIPTION OF THE PREFERRED DRAWINGS

It is highly desirable to try and increase the initial concentration of deuterium in processes which involve the production of heavy water or any processes which require substantially pure deuterium. The invented method results in increasing the initial concentration of deuterium to about 10% to 20% from the normally available abundance of 0.014% in one step. Such a 1000 fold increase in the magnitude of the initial concentration of deuterium greatly improves the efficiency so that even low temperature distillation techniques could be employed effectively in concentrating the deuterium isotope to about 90% to 99.9% purity (either as $D_2O$ or $D_2$).

The present invention utilizes certain RX molecules in which R is preferably an organic radical selected from the ethyl, isopropyl, t-butyl or 3-cyclopentenyl groups; and, X is preferably one of the inorganic radicals F, Cl, Br, or OH. In the special case of cyclopentene X = H is both operative and advantageous as will be hereinafter described.

The following structural formulas illustrate the preferred R structures:

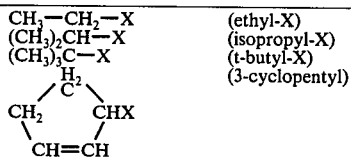

| | |
|---|---|
| $CH_3-CH_2-X$ | (ethyl-X) |
| $(CH_3)_2CH-X$ | (isopropyl-X) |
| $(CH_3)_3C-X$ | (t-butyl-X) |
| | (3-cyclopentyl) |

By way of example, a molecule such as ethyl-X ($C_2H_5X$) having five hydrogen atoms will have a fivefold greater chance of containing a deuterium atom than a molecule with only one atom of hydrogen. Thus, the population of such $C_2H_5X$ molecules will have a 0.07% chance of containing 1 deuterium atom/molecule. By similar reasoning, the isopropyl-X molecule ($C_3H_7X$) will contain a natural abundance of 0.001 deuterium/molecule, i.e., 1 in 1,000 molecules will contain a deuterium atom, etc.

The infrared spectra of molecules such as $C_2H_4DX$, $C_3H_6DX$, $C_4H_8DX$ and $C_5H_6DX$ will differ appreciably from their respective non-deuterated species. In particular, they will all have a unique stretching frequency at about 2100 $cm^{-1}$ and a unique bending frequency at about 900 $cm^{-1}$ which will be clearly distinguishable from the hydrogen only related deformation frequencies in the same region. Current CO lasers are readily adapted to tuning at the 2100 $cm^{-1}$ frequency region while $CO_2$ and $N_2O$ lasers can be tuned to the appropriate frequency in the vicinity of 900 $cm^{-1}$. Suitable spectra data may be found in G. Herzberg, *Infrared and Roman Spectra of Polyatomic Molecules*, D. van Nostrand Co., New York (1945); and, in A.P.I. Res. Project 44, "Selected Infrared Spectral Data". Thermodynamics Research Center, Texas A & M University, Bryant, Texas. For example, data on the liquid spectra of i-propyl chloride and 2-deutero isopropyl chloride, shows that the latter absorbs strongly at 1205 $cm^{-1}$, 1120 $cm^{-1}$, and 918 $cm^{-1}$, while the former is transparent at each of these frequencies.

By selecting the desired RX molecules and determining by conventional methods from available references its spectroscopy, one can employ intense tuned infrared laser sources of optimum wave length to obtain the desired separation and increased initial concentrations of deuterium. For each RX molecule one should do the necessary spectroscopy both on the non-deuterated and the one or more possible mono-deuterated species to determine the opimum wave length to be used in exciting the deuterium containing molecule with the infrared laser. The identifications of suitable spectral bands involves trial and error procedures. One starts by finding the frequencies at which the mono-deuterated compound absorbs while the non-deuterated is transparent. Only these frequencies need to be tested to see which lead to high efficiency decomposition in the laser beam. Once this is accomplished the normally occurring population of the selected RX is exposed to the properly focussed infrared laser beam. The proper focussing will depend on the pressure and molecules to be used using conventional pretesting and optimization techniques known in the infrared laser field. Standard light pipes may be used, if desired, to make more efficient use of the laser beam.

In operation, a single laser beam can be used in a pulsed mode with a suitably chosen light pipe so that 50% or more of the incident energy may be absorbed by the deuterium containing species in the path length. Alternatively, two laser beams can be used, one which is a relatively weakly focussed beam, but carefully tuned to give high isotopic selectivity and, a second beam which is a more strongly focussed beam of higher energy density with lesser requirements on beam quality and tuning to provide the necessary dissociation energy to dissociate the molecules excited by the weaker beam.

By way of example, in practise for $C_2H_5X$, the conditions will be such as to dissociate nearly every deuterium containing member in the light pipe. Allowing for some scrambling and various other losses a highly conservative amount of dissociation would be 50%. This will amount to about 0.04% of the initial charge. After dissociation the molecular products are $C_2H_3D$ + HX. Under ambient conditions the reverse reaction is negligible and the products after irradiation can be easily separated from the starting material. Because of isotope effects in such reactions the $C_2H_3D$ product molecules will have an 85% probability of containing the deuterium atom and thus a 20% deuterium enriched supply can be obtained.

The probabilities of obtaining the deuterium atom can be determined from the literature. If all probabilities were equal for finding the D-atom in any position, then the maximum amounts of DX produced would be about 20% from $C_2H_5X$; about 14% from i-$C_3H_7X$; about 11% from t-$C_4H_5X$, and about 12.5% from cyclopentenyl X. However, where the H and D are found in equivalent positions, there is about a 2 to 3 fold higher chance of eliminating the H atom. This reduces the first three percentages (dividing by 2.5) to about 8%, 5.6%, and 4.4%, respectively. There is no reduction for the cyclopentenyl because only the cis-H (or D) atom across the ring from X must react with X. References for the above-described results can be found in P. J. Robinson and K. A. Holbrook, "Unimolecular Reactions", Chapter 9 (esp. page 303), Wiley-Interscience, London (1972); and C. J. Collins and N. S. Bowman, ed., "Isotope Effects in Chemical Reactions", Am. Chem. Soc. Monograph (1970), Washington, D. C.

Therefore, the probabilities in the olefin products for obtaining a deuterium atom can vary from about 85% to as large as 96% as described above and supported by the cited literature references.

The undecomposed molecules $C_2H_5X$, described above by way of example, depleted of their deuterium containing species can now be decomposed or dissociated by heating to about (200° to 300° C) over a silica cayalyst to obtain $HX + C_2H_4$. The HX and $C_2H_4$ can be exchanged catalytically with normal water or $H_2$ to bring them up to normal abundance and then made to recombine at lower temperatures and higher pressures to reform normal $C_2H_5X$.

The molecules of enriched olefin (D) obtained in the product can be burned to obtain $CO_2$ + deuterium enriched $H_2O$ (20 mole % deuterium) used as a material in further enrichment.

The equilibria for $RX \rightleftarrows olefin + HX$ have all been studied and the optimum conditions of temperature and pressure suitable for each R and each X may be deduced from the published thermochemical data. (See, for example, S. W. Benson and A. N. Bose, J. Chem. Phys., 39, 3463 (1963); or D. Stull, D. Westrum and G. Sinke, *The Chemical Thermodynamics of Organic Compounds*, John Wiley & Sons, Inc., New York (1969).

Various RX molecules can theoretically be used in the invented process. However, the advantages of using larger over smaller molecules (e.g. $C_4H_9X$ or $C_3H_7X$ over $C_2H_5X$) have to do with the relative initial decomposition rates and the characteristics of the pressure-energy trade-offs as well as the spectroscopic selectivity. Small molecules will decompose more rapidly with less energy absorption from the laser beam and hence less side reactions are involved. Larger molecules will be closer to their high pressure limiting rates, will give higher isotope effects in reaction and be decomposed to larger extents. The optimum conditions, economics and practicality should be considered for a starting material prior to selecting such material. Molecules such as t-$C_4H_9X$ will have about twice as many deuterium containing members as $C_2H_5X$. However, the concentration obtained in the products i-$C_4H_8$ will be half as great as with the product $C_2H_4$ from $C_2H_5X$. The over-all spectroscopy and tuning requirements may also vary substantially from molecule to molecule. However, the determination of such requirements involve trial and error techniques well known in the art and do not form a part of the present invention.

It should be understood that large molecules (i.e. those with many atoms) have many internal vibrations of relatively low frequency. Hence, some of them at room temperature will possess vibrational energy quanta. If they have enough quanta, their spectral absorption may be more complex than the non-excited molecules and may overlap the frequencies of the deuterium-containing molecules. Since the latter are only about one part in 1000 of the population, it does not take many vibrationally excited molecules to interfere (or react) competitively. Because of this problem, it is important to try to choose spectral lines not overlapped by absorptions of the excited molecules.

The invented process discussed above will now be described with reference to the annexed drawing which shows in a schematic flow diagram form the presently preferred version of the process. It should be understood that except where otherwise indicated, all the RX molecules previously identified and discussed behave and function in substantially the same manner.

As explained previously, the various RX molecules recited above readily lend themselves to selective radiation of deuterium containing molecules when subjected to intense tuned, infrared lasers, such as CO, $CO_2$ or $N_2O$ lasers. As shown in the drawing, normal RX molecules 10 (i.e. those molecules containing a normal abundance of hydrogen and deuterium) are exposed to a suitably focussed infrared laser beam which is pulsed in the laser reactor A. Those RX molecules (about 1 part per 1000) which contain a deuterium atom will absorb the radiation and are preferentially decomposed and under proper conditions lead to the formation of an olefin $R(-H)$ containing the deuterium atom (olefin (D)) and Hx. By way of example, after passing through laser reactor A the unreacted RX (i.e., $RX_{(-D)}$) typically constitutes about 99.9% of the output 12 and the olefin (D) and HX together constitute about 0.1% of the output 12.

The invented process results in the RX molecules being preferentially decomposed into stable molecular fragments and not reactive radicals. Therefore, no radical scavengers are needed to prevent the scrambling of identity between the istopically selected irradiated molecules and non-isotope bearing RX molecules.

The output 12 from the laser reactor A is then passed into a separator B where the deuterium enriched olefin (D) is stripped from the unreacted $RX_{(-D)}$ and HX. The enriched olefin (D) molecules will normally have about a 10% to 20% deuterium content. The separation can be easily accomplished in separator B by known absorption techniques (e.g. with ammonia), by distillation or by other simple chemical separation methods, such as by using silver salts like silver nitrate to form complex salts which will bind the olefins and separate upon further heating. Also, known transitional metals such as palladium and ruthenium can be used in the separation process.

The enriched olefin (D) product 14 from separator B can then be burned in $O_2$ in a combustion unit F to form $H_2O$ and $CO_2$. The $H_2O$ stream 15 so formed will typically have about a 10% to 20% deuterium content. The final deuterium composition is determined by the formula $C_nH_{2n+1}X$. It will be $1/(2n+1)$ less whatever side reactions or spurious effects produce dilution. If desired, the enriched $H_2O$ 15 can be used as a starting material for further enrichment as is now done in common practice. The enriched olefin (D) product can optionally be pyrolyzed over graphite at high temperatures (e.g. about 1000° to 1200° C) in a furnace F' to form hydrogen gas and carbon directly. The hydrogen gas 15' thus formed will typically have a 10% to 20% deuterium content and can be economically concentrated by cryogenic distillation to obtain substantially pure deuterium (i.e., 90 to 99.9% purity).

The unreacted, deuterium depleted molecules (i.e. $RX_{(-D)}$) and HX leave separator B as stream 16 which is sent to cayalytic stripper C in which the $RX_{(-D)}$ is decomposed into an olefin $R(-H)$ depleted in deuterium and HX by heating 16 at about 200° to 300° C over a suitable catalyst such as silica gel. The latter olefin and HX species from stripper C are then separated as streams 18 and 20, respectively, and sent to a catalytic exchanger D into which ordinary or normal water 26 is brought in and exchanged catalytically with (i) the deuterium depleted olefin stream 18 to produce a normal olefin with a natural abundance of deuterium and (ii) the deuterium depleted HX stream 20 to restore its deuterium content to normal HX. In such catalytic exchange treatments it is suggested that known countercurrent exchange techniques be employed for efficiency. Known catalysts for this purpose are acidified silica gel, silica-alumina gel, sulfuric acid or transitional metal ions in acid aqueous media. The water depleted of deuterium leaves the catalytic exchanger D as stream 28 and is not used again in the process.

The normal olefin leaves the catalytic exchanger D as 22 and the normal HX leaves the exchanger D as 24. The normal olefin 22 and the normal HX 24 are then sent to a catalytic recombination unit E to reform isotopically normal RX which is available to be recycled as input 10' into the laser reactor A and the entire aforementioned cycle repeated to obtain the desired dueterium separation and enrichment. The catalytic recombination in unit E can be accomplished on a catalytic surface using homogenous catalysts of the same general descriptions recited above for the catalytic exchanger D. Also, $H_2$ or platinum catalysts can be employed or super acids (e.g. chlorosulfuric acid) and $H_2$ at somewhat lower temperatures.

It should be understood that the above described process is generally applicable to the various RX molecules defined previously. However, in the special case of cyclopentene (where X = H) the products after exposure to the laser reactor A, are $H_2$ and cyclopentadiene with the latter containing about 85% of the enriched deuterium (i.e., 81% deuterium absolute composition) and the $H_2$ containing about 15% (i.e., about 2% absolute). Both of these latter products can be readily separated from the parent cyclopentene and made to produce carbon and $H_2$ containing about 10% deuterium. The unreacted or undissociated cyclopentene can then be exchanged directly with normal water using acid catalysts to restore the normal deuterium content and recycled without having to dissociate and recombine. As such, cyclopentene may have substantial advantages over the other RX materials. For example, catalytic stripper C and catalytic recombination unit E can be deleted in the recycle operation.

From the point of view of cost, the least expensive functional group X is Cl. It also seems to be the most simple in terms of spectra and spectral purity relative to isotopic tuning and possessing a very small fraction of hot bands. H = Br is less desirable than Cl both because of the cost factor and because of the spectral purity. X = OH is not expensive, but its reactions appear to be more complex than X = Cl because of possible competing radical production. X = F is more expensive than X = Cl; and, like X = OH may involve some further complications due to radical formation.

While water has been described in the preferred process as the source of replenishing the depleted deuterium, it should be understood that any other available sources (e.g. $H_2$) which contain at least a normal or natural abundance of deuterium can be used. The various percentages used herein, unless otherwise indicated, refer to mole percentages.

The present invention provides a highly efficient and economical process for separating the deuterium isotope and providing an enriched deuterium supply for applications such as the production of heavy water which is in great demand as a moderator for nuclear fission reactors. Also, the deuterium isotope is frequently used as a tracer element.

The preferred method shown in the drawing and described above is for purposes of illustration and should not be construed as limiting the present invention. It will be apparent to those skilled in the art that certain modifications can be made with respect to the above-described preferred method without departing from the over-all scope and spirit of the present invention. For example, other suitable and known catalysts and conventional separation techniques could be utilized in lieu of those specifically mentioned in the preferred method. It will be apparent that one way to operate the present invention is in connection with some facility that manufactures products such as ethylene (e.g. a polyethylene or PVC plant) or propylene. More efficiently, however, the various olefins (e.g. $C_2H_4$, $C_3H_6$, etc.) can be continuously recycled by exchanging them with normal $H_2O$ to restore their deuterium isotope abundance as shown in the annexed drawing and described above. It is also contemplated and expected that the basic process for the separation of isotopic species described above could be used for molecules similar to the RX molecules discussed above. For example, R—Cl to separate $^{35}Cl$ and $^{37}Cl$; R—Br to separate $^{79}Br$ and $^{81}Br$; and, R—OH to separate $^{18}O$ and $^{17}O$ and $^{16}O$.

I claim:

1. A method for separating and enriching deuterium containing molecules comprising the steps of:
   (a) providing a source of organic molecules containing deuterium atoms, said organic molecules having a structural formula RX, in which R is an organic radical selected from the group consisting of ethyl, isopropyl, t-butyl and 3-cyclopentenyl and in which X is selected from the group consisting of F, Cl, Br and OH;
   (b) exposing said molecules to the radiation of at least one infrared laser source which has been specifically tuned and focussed to selectively decompose RX molecules containing deuterium to form an enriched olefin specie containing deuterium and HX; and
   (c) separating said deuterium enriched olefin specie from the undecomposed deuterium depleted RX molecules and HX.

2. The method of claim 1 in which said deuterium enriched olefin specie is converted into water with an enriched deuterium content.

3. The method of claim 2 in which said deuterium enriched water contains about 10% to 20% deuterium.

4. The method of claim 1 in which said deuterium enriched olefin specie is pyrolyzed to form hydrogen gas with an enriched deuterium content.

5. The method of claim 4 in which said deuterium enriched hydrogen gas contains about 10% to 20% deuterium.

6. The method of claim 1 in which said undecomposed deuterium depleted RX and said HX molecules are subsequently treated with a deuterium containing source to restore in the latter deuterium depleted molecules a supply of deuterium atoms.

7. The method of claim 4 in which said deuterium restored molecules are recycled as the source of RX molecules to be exposed to said infrared laser radiation for further selective decomposition and separation of deuterium containing molecules.

8. The method of claim 1 in which said undecomposed deuterium depleted RX and said HX molecules are catalytically treated and separated into a deuterium depleted olefin and HX, then individually exchanged with water or $H_2$ to restore therein, a normal abundance of deuterium, and then said exchanged olefin and HX are recombined to form a supply of RX which can be exposed to said infrared laser for further selective deuterium specie decomposition and separation.

9. The method of claim 1 in which said laser is specifically tuned to provide pulsed frequencies in the range of about $900 cm^{-1}$ to $2100 cm^{-1}$.

10. The method of claim 9 in which said infrared laser is a $CO_2$ or $N_2O$ laser.

11. The method of claim 9 in which said infrared laser is a CO laser.

12. A method for separating and enriching deuterium containing molecules comprising the steps of:
 (a) providing a source of cyclopentene molecules containing deuterium atoms;
 (b) exposing said cyclopentene molecules to the radiation of at least one infrared laser source which has been specifically tuned and focussed to selectively decompose deuterium containing cyclopentene molecules into a deuterium enriched cyclopentadiene specie and hydrogen; and
 (c) separating said deuterium enriched cyclopentadiene and hydrogen gas from the undecomposed deuterium depleted cyclopentene.

13. The method of claim 12 in which said deuterium enriched cyclopentadiene is converted into water with an enriched deuterium content.

14. The method of claim 13 in which said enriched water contains at least about 10% deuterium.

15. The method of claim 12 in which said deuterium enriched cyclopentadiene is pyrolyzed to form further hydrogen gas with an enriched deuterium content.

16. The method of claim 15 in which said further enriched hydrogen gas contains at least about 10% deuterium.

17. The method of claim 12 in which said deuterium depleted cyclopentene is cataytically exchanged with water or $H_2$ to produce cyclopentene having a restored abundance of deuterium which is then exposed to said infrared laser for further selective deuterium specie decomposition and separater.

18. The method of claim 12 in which said laser is specifically tuned to provide preselected pulsed frequencies in the range of about $900 cm^{-1}$ to $2100 cm^{-1}$.

19. The method of claim 16 in which said infrared laser is a $CO_2$ laser.

20. The method of claim 16 in which said infrared laser is a CO laser.

21. A method for separating and enriching deuterium containing molecules comprising the steps of:
 (a) providing a source of organic molecules containing a normal abundance of hydrogen and deuterium atoms, said organic molecules having a structure RX, in which R is an organic radical selected from the group consisting of ethyl, isopropyl, t-butyl and 3-cyclopentenyl and X is selected from the group consisting of F, Cl, Br and OH;
 (b) exposing said molecules to the radiation of at least one infrared laser source which has been specifically tuned and focussed in the frequency of about $900 cm^{-1}$ to $2100 cm^{-1}$ to selectively decompose only RX molecules containing at least one deuterium atom thereby forming a molecular deuterium enriched olefin specie and HX;
 (c) separating said deuterium enriched olefin from the undecomposed deuterium depleted RX molecules and HX;
 (d) treating said undecomposed deuterium depleted RX molecules to form a deuterium depleted olefin;
 (e) separating said deuterium depleted olefin from the deuterium depleted HX;
 (f) exchanging said deuterium depleted olefin and said HX with a source of at least a normal abundance of hydrogen and deuterium atoms to restore the depleted deuterium content;
 (g) recombining the deuterium restored olefin and HX to form RX molecules having at least a normal abundance of deuterium atoms; and
 (h) recycling the recombined RX molecules as the source of organic molecules as specified in (a) above.

22. The method as claim 21 in which said deuterium enriched olefin specie is converted into water with an enriched deuterium content.

23. The method of claim 21 in which said deuterium enriched olefin specie is pyrolyzed to form hydrogen gas with an enriched deuterium content.

24. The method of claim 21 in which said deuterium restored molecules are recycled as the source of RX molecules to be exposed to said infrared laser radiation for further selective decomposition and separation of deuterium containing molecules.

25. The method of claim 21 in which said infrared laser is a $CO_2$ or $N_2O$ laser.

26. The method of claim 21 in which said infrared laser is a CO laser.

27. A method for separating and enriching deuterium containing molecule comprising the steps of:
 (a) providing a source of cyclopentene molecules containing a normal abundance of hydrogen and deuterium atoms;
 (b) exposing said cyclopentene molecules to the radiation of at least one infrared laser source which has been specifically tuned and focussed in the frequency range of $900 cm^{-1}$ to $2100 cm^{-1}$ to selectively decompose cyclopentene molecules containing at least one deuterium atom thereby forming a deuterium enriched cyclopentadiene specie and hydrogen;
 (c) separating said deuterium enriched cyclopentadiene specie and hydrogen from the undecomposed deuterium depleted cyclopentene molecules.
 (d) exchanging said deuterium depleted cyclopentene molecules with a source of at least a normal abundance of hydrogen and hydrogen and deuterium atoms to restore the depleted deuterium in the cyclopentene; and,
 (e) recycling the deuterium restored cyclopentene molecules as the source of cyclopentene as specified in (a) above.

28. The method of claim 27 in which said deuterium enriched cyclopentadiene is converted into water with an enriched deuterium content.

29. The method of claim 27 in which said deuterium enriched cyclopentadiene is pyrolyzed to form further hydrogen gas with an enriched deuterium content.

30. The method of claim 27 in which said infrared laser is a $CO_2$ or $N_2O$ laser.

31. The method of claim 27 in which said infrared laser is a CO laser.

* * * * *